United States Patent
Brassfield et al.

(10) Patent No.: US 8,810,156 B2
(45) Date of Patent: Aug. 19, 2014

(54) LED DRIVER SYSTEMS AND METHODS

(71) Applicant: Texas Instruments Incorporated, Dallas, TX (US)

(72) Inventors: Joel Nathan Brassfield, Homer Glen, IL (US); Ashish Khandelwal, Malden, MA (US)

(73) Assignee: Texas Instruments Incorporated, Dallas, TX (US)

( * ) Notice: Subject to any disclaimer, the term of this patent is extended or adjusted under 35 U.S.C. 154(b) by 147 days.

(21) Appl. No.: 13/644,496

(22) Filed: Oct. 4, 2012

(65) Prior Publication Data

US 2013/0082624 A1  Apr. 4, 2013

Related U.S. Application Data

(60) Provisional application No. 61/543,158, filed on Oct. 4, 2011.

(51) Int. Cl.
*H05B 37/02* (2006.01)

(52) U.S. Cl.
USPC ............ 315/297; 315/291; 315/294; 315/307

(58) Field of Classification Search
USPC .................. 315/291, 294, 297, 307–308
See application file for complete search history.

(56) References Cited

U.S. PATENT DOCUMENTS

| | | | |
|---|---|---|---|
| 2006/0202631 A1* | 9/2006 | Hayafuji et al. | 315/169.2 |
| 2009/0033243 A1* | 2/2009 | Gater | 315/291 |
| 2011/0140620 A1* | 6/2011 | Lin et al. | 315/224 |
| 2012/0146540 A1* | 6/2012 | Khayat et al. | 315/291 |

* cited by examiner

*Primary Examiner* — Jason M Crawford
(74) *Attorney, Agent, or Firm* — William B. Kempler; Frederick J. Telecky, Jr.

(57) ABSTRACT

A light-emitting diode (LED) driver system includes a control circuit that provides a waveform for driving a power transistor to generate a regulated current through one or more LEDs, and an error amplifier that generates an output compensation signal based on a comparison of a desired regulated current and an actual regulated current through the one or more LEDs. The output compensation signal is used to set an output compensation voltage that sets the duty cycle of the waveform. The LED driver system further comprises a dimming control device configured during a dimming control mode to alternate between dimming-on time periods and dimming-off time periods, and a sample and hold switch having a first state for holding the output compensation voltage fixed during each dimming-off time period, and a second state for restoring the error amplifier to its previous dimming-on operating state upon returning to each subsequent dimming-on time period.

20 Claims, 7 Drawing Sheets

LED DRIVER SYSTEMS AND METHODS

RELATED APPLICATIONS

This application claims priority to provisional application 61/543,158, filed on Oct. 4, 2011, the entire contents of which is incorporated herein by reference.

TECHNICAL FIELD

The present invention relates generally to electronics, and specifically to light-emitting diode (LED) driver systems and methods.

BACKGROUND

The use of light-emitting diode (LED) strings instead of fluorescent bulbs for use in illumination is drastically increasing based on consumer demands for better light quality. In addition, typical LED light efficacy can be much better than conventional lighting systems, thus consuming significantly less power. In addition, amongst other advantages, LED systems can be smaller and more environmentally friendly, and can have a faster response with less electro-magnetic interference (EMI) emissions. A number of LED regulation techniques exist for typical LED systems, such as constant-current regulation, constant-voltage regulation, and a combination of constant-current/constant-voltage regulation.

Many LED drivers (power supplies) provide a regulated constant current output which drives an LED string to create a constant light output. Most LED drivers contain a method to dim the light output from full scale to something less than full scale. The dimming can be done in a linear fashion by decreasing the regulated output current, or the dimming can be done in a pulse-width-modulation fashion by duty cycle modulation of the full scale regulated current. Photometrically, there are advantages to PWM dimming, since the color shift of the light output is reduced compared to linear dimming.

Early LED drivers were created by using voltage-regulator drivers adapted for current regulation. The PWM dimming was accomplished by modulating the driver's Enable pin, which cycled the entire driver on and off at a low frequency, and variable duty cycle. The PWM dimming performance of this approach suffered since the drivers internal circuitry (bandgap, internal voltage regulators, oscillator, etc.) was often times disabled as the driver was disabled. Therefore, when the driver was re-enabled there was an undesirable delay due to the driver initialization before it could provide a regulated output current. Other early LED drivers reused voltage-regulator driver features such as soft-start for PWM Dimming. The soft-start capacitor was actively discharged during PWM Dimming off-times, and released during PWM Dimming on-times. Soft-start also proved to have an undesirable delay because it limited the system's recovery response time during PWM Dimming.

In an attempt to maximize PWM Dimming performance, most LED drivers abandoned the conventional fixed frequency control method and instead moved to a hysteretic controller. In a hysteretic controller, the driver's output current is compared to two thresholds: a low threshold, and a high threshold. This improves PWM dimming performance quite drastically, and removed the error amplifier from the driver. However, with a hysteretic control method, a major drawback is that multiple LED drivers cannot be synchronized to a common oscillator. Other PWM Dimming approaches connect/disconnect the entire LED string via a power FET located in series with the LED. The LED is quickly opened by the FET, meaning its current goes to zero instantaneously. However, reconnecting the LED string can often cause overshoots in the LED current if the system is not well controlled. Another approach connects/disconnects the charged output capacitor via a power FET in series with the output capacitor. This preserves the output voltage during PWM dimming off-times, at the expense of a costly power FET.

SUMMARY

In accordance with an aspect of the present invention, a light-emitting diode (LED) driver system is provided that comprises a control circuit that provides a waveform for driving a power transistor to generate a regulated current through one or more LEDs, and an error amplifier that generates an output compensation signal based on a comparison of a desired regulated current and an actual regulated current through the one or more LEDs. The output compensation signal is used to set an output compensation voltage that sets the duty cycle of the waveform. The LED driver system further comprises a dimming control device configured during a dimming control mode to alternate between dimming-on time periods and dimming-off time periods that cause the waveform to alternate on and off modifying the brightness of the one or more LEDs, and a sample and hold switch having a first state for holding the output compensation voltage fixed during each dimming-off time period and a second state for restoring the error amplifier to its previous dimming-on operating state upon returning to each subsequent dimming-on time period.

In accordance with another aspect of the present invention, a lighting system is provided that comprises an oscillator that provides one or more synchronized oscillating drive signals, a pulse width modulated (PWM) dimming device to provide a PWM dimming control signal, and a plurality of current regulators. Each current regulator comprises a control circuit driven by the one or more synchronized oscillating drive signals to provide a waveform having a relatively high frequency for driving a power transistor to generate a regulated current through one or more LEDs, an error amplifier that generates an output compensation current based on a comparison of a reference voltage to a sense voltage associated with the actual regulated current through the one or more LEDs, and one or more compensation components that set an output compensation voltage based on the output compensation current. The output compensation voltage is utilized to provide a signal to compare to actual current through the power transistor to set the duty cycle of the waveform. Each current regulator further comprises a PWM dimming control device configured during a PWM dimming control mode to generate a dimming control signal having a relatively low frequency compared to the frequency of the waveform, that alternates during dimming-on time periods and dimming-off time periods, which causes the waveform to alternate on and off modifying the brightness of the one or more LEDs. Each current regulator also comprises a sample and hold switch controlled by the dimming control signal to have a first state for holding the output compensation voltage fixed during each dimming-off time period and a second state for restoring the error amplifier to its previous dimming-on operating state upon returning to each subsequent dimming-on time period.

In accordance with yet another aspect of the invention, a method of driving LEDs is provided. The method comprises providing a waveform for driving a power transistor to generate a full brightness regulated current through one or more LEDs, generating an output compensation level that sets the duty cycle of the waveform based on a comparison of a desired regulated current and an actual regulated current by an error amplifier, and generating a dimming control signal that alternates between dimming-on time periods and dimming-off time periods that cause the waveform to alternate on and off modifying the brightness of the one or more LEDs. The method further comprises holding the output compensation level to a fixed level during each dimming-off time period, and restoring the error amplifier to its previous dimming-on operating state upon returning to each subsequent dimming-on time period.

DETAILED DESCRIPTION

Figure 1:
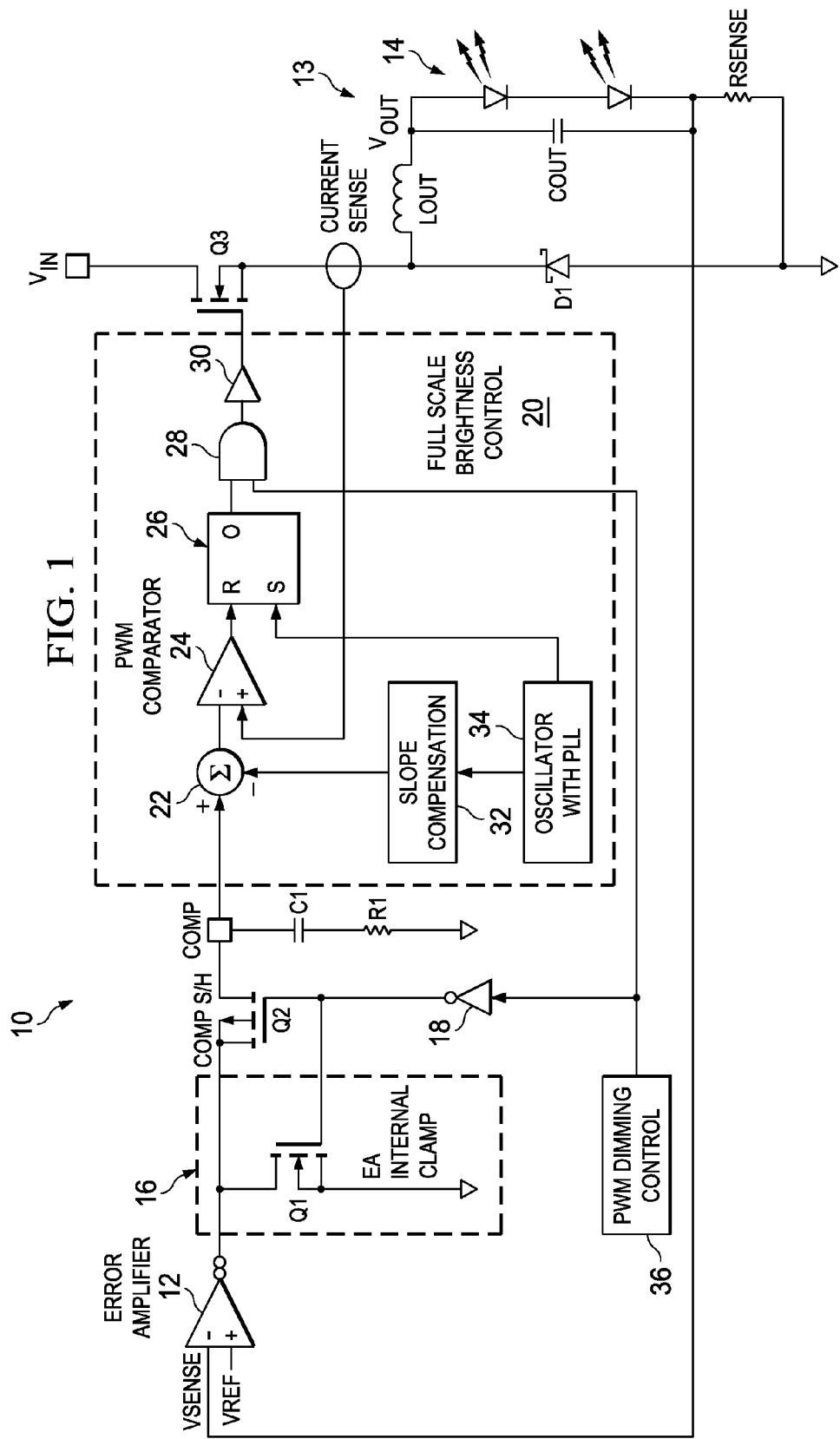
FIG. 1 illustrates an example of an LED driver system in accordance with an aspect of the invention.

The present invention relates generally to electronic circuits, and specifically to a light-emitting diode (LED) driver system that provides a constant regulated current to one or more LEDs. Full scale brightness is achieved by driving a full scale brightness control circuit at a relatively high frequency (e.g., 500 KHz) with an oscillator. One or more LED driver systems can be synchronized by driving the one or more LED driver systems with an oscillating drive signal associated with the same oscillator. The LED driver system employs pulse width modulation (PWM) dimming by PWM modulation of the full scale brightness current control at a relatively low frequency (e.g., 100 Hz to 10 KHz). An output error amplifier compares a reference voltage to a voltage across a sense resistor in series with the one or more LEDs to regulate the full brightness current through the one or more LEDs. The output of the error amplifier is connected to compensation control components that compensate for a second order filter formed by output components of the LED output circuit. The compensation control components also set a compensation control level (e.g., voltage or current) which sets the steady state duty cycle of the power transistor drive signal of the LED output circuit.

A major limitation with conventional error amplifiers and fixed frequency control for LED drive systems is the compensation control voltage. During PWM dimming off-times while in dimming control mode, the error amplifier's feedback path suddenly is open, and the error amplifier output will saturate to one of its rails. When the PWM dimming control signal commands the next dimming on-time, the error amplifier output has to slew back to its operating voltage. The slew time is a function of the error amplifiers load capacitance and its current capability. As the error amplifier recovers to its operating voltage, the LED current can overshoot, or have an undesirable response. This puts a limitation on the PWM dimming duty ratio (very small on-times), and degrades the linearity of the LED light output versus PWM dimming duty cycle.

Therefore, in accordance with one aspect of the present invention, an LED driver system is provided that includes a clamp circuit (e.g., one or more switches) that clamps the output of an error amplifier to a fixed voltage (e.g., ground) during dimming off-time periods, and removes the clamping during dimming on-time periods. The output of the error amplifier can be concurrently disconnected from compensation components during dimming off-time periods and reconnected to the compensation components during dimming-on time periods, for example, employing a sample and hold switch. This disconnection results in the holding of the compensation voltage at a fixed level during the dimming-off time periods at its previous dimming-on state. Upon reconnection of the error amplifier output to the compensation components at a subsequent dimming-on time period, the output of the error amplifier is restored to its operating state that it was at during the previous dimming-on time period, which mitigates slew errors associated with the output amplifier saturating to one of its rails.

In accordance with another aspect of the present invention, an LED driver system is provided that includes a sample and hold switch disposed between the sense resistor and the input of the sense voltage to the error amplifier. A capacitor is coupled between the sample and hold switch and the input of the sense voltage to the error amplifier. During dimming off-time periods, the sample and hold switch is opened disconnecting the sense resistor from the error amplifier, while the capacitor concurrently holds the sense voltage at its previous dimming-on state. This results in the holding of the compensation voltage at its previous dimming-on state. Upon reconnection of the sense resistor RSENSE to the error amplifier input upon returning to a subsequent dimming-on time period, the error amplifier is restored to its previous operating state that is was during the previous dimming-on cycle, which also mitigates slew errors associated with the output of the error amplifier saturating to one of its rails.

The LED driver system of the present invention allows for the use of a fixed-frequency control methodology, consisting of an error amplifier and a synchronizable fixed frequency oscillator, while simultaneously improving PWM dimming performance. Additionally, the LED driver system can preserve the error amplifiers control voltage via, for example, one or more small-signal switches, rather than manipulating the power stage voltages via costly, high-voltage external power switches. Furthermore, the inductor current slew rate is no longer a function of the error amplifier. It is solely a function of $V_{IN}$ minus $V_{OUT}$, which is the same limitation of a hysteretic controller. Therefore, less time is spent slewing, and the LED current approaches that of a pulse waveform. This has a benefit on minimizing color shift in the light output. The LED driver system allows all the benefits of improved PWM Dimming performance that hysteretic-controlled LED drivers have, but with the additional benefit of frequency synchronization for reduced EMI noise.

As used herein, the term "dimming-on time period or periods" is defined as the time period or periods during a dimming control mode (i.e., not normal mode) in which current is provided to one or more LEDs, and the term "dimming-off time period or periods" is defined as the time period or periods during a dimming control mode in which current is not being provided to the one or more LEDS. During the dimming control mode, a dimming control signal is provided that toggles between high and low logic states, while during normal mode the dimming control signal is fixed.

FIG. 1 illustrates an example of an LED driver system 10 in accordance with an aspect of the invention. The LED power driver system 10 includes a full scale brightness control circuit 20 configured to provide a gate drive waveform to a power transistor (Q3) that together cooperate to generate a constant full brightness regulated current through one or more LEDs of an LED string 14 of a LED output circuit 13. The gate drive waveform has a relatively high frequency (e.g., 500 KHz) and coincides with a frequency of an oscillating drive signal of an oscillator with a phase locked loop (PLL) 34. The LED driver system 10 employs pulse width modulation (PWM) dimming by PWM modulation of the full scale brightness current control circuit 20, and thus the gate drive waveform, at a relatively low frequency (e.g., 100 Hz to 10 KHz) employing a PWM dimming control circuit 36.

The LED output circuit 13 includes an output inductor (LOUT) with a first end coupled to a first end of the power transistor Q3 and a Schottky diode (D1) coupled to ground. A second end of the power transistor Q3 is coupled to an input voltage (VIN). A second end of the output inductor LOUT is coupled to a first end of an output capacitor (COUT) and a first end of the LED string 14 that includes one or more LEDs coupled in a series arrangement. The LED string 14 is coupled to a second end of the output capacitor COUT, such that the LED string 14 and output capacitor COUT are arranged in a parallel configuration to provide an output voltage (VOUT) across the LED string 14. A sense resistor (RSENSE) is coupled in series with the LED string 14 to provide a sense voltage (VSENSE) associated with the current running through the LED string 14. This configuration of the LED output circuit is commonly known as a non-synchronous buck regulator. However, the invention can apply to other power supply topologies, such as a boost or buck-boost, etc, or even synchronous regulators.

During full scale brightness operation (or normal operation), an output error amplifier 12 (e.g., transconductance amplifier) compares a reference voltage (VREF) (e.g., 200 mV) to the sense voltage VSENSE and generates a current correlated with the difference between the reference voltage VREF and the sense voltage VSENSE. The PWM dimming control circuit 36 is set to a logic high in this example, which applies a logic low to a compensation sample and hold switch PFET (Q2). This allows current to flow to compensation components C1 and R1 through compensation sample and hold switch Q2 to establish a compensation voltage at a compensation node (COMP). The compensation control components C1 and R1 compensate for a second order filter formed by output inductor LOUT, output capacitor COUT and the LED string 14. The compensation control voltage at the compensation node also sets the steady state duty cycle of the gate drive signal of the power transistor Q3.

In the present example, the full brightness control circuit 20 is a peak current-mode control circuit. However, a variety of other types of full brightness control circuits could be employed in accordance with the present invention. In the present example, the compensation voltage is summed with a slope compensation signal provide by a slope compensation component 32 driven by the oscillator 34 to stabilize peak current-mode control. The summed signal is compared with a scaled down version of the current sensed through the power transistor Q3 by a PWM comparator 24 that has an output connected to a reset input of an R-S flip flop 26. The oscillating drive signal is provided to a set input of the R-S flip flop 26. An And gate 28 receives the output of the RS-flip flop 26 and the PWM dimming control signal, which is set to a logic high. The output of the And gate 28 is buffered by a buffer 30 that drives the gate of the power transistor Q3.

Figure 2:
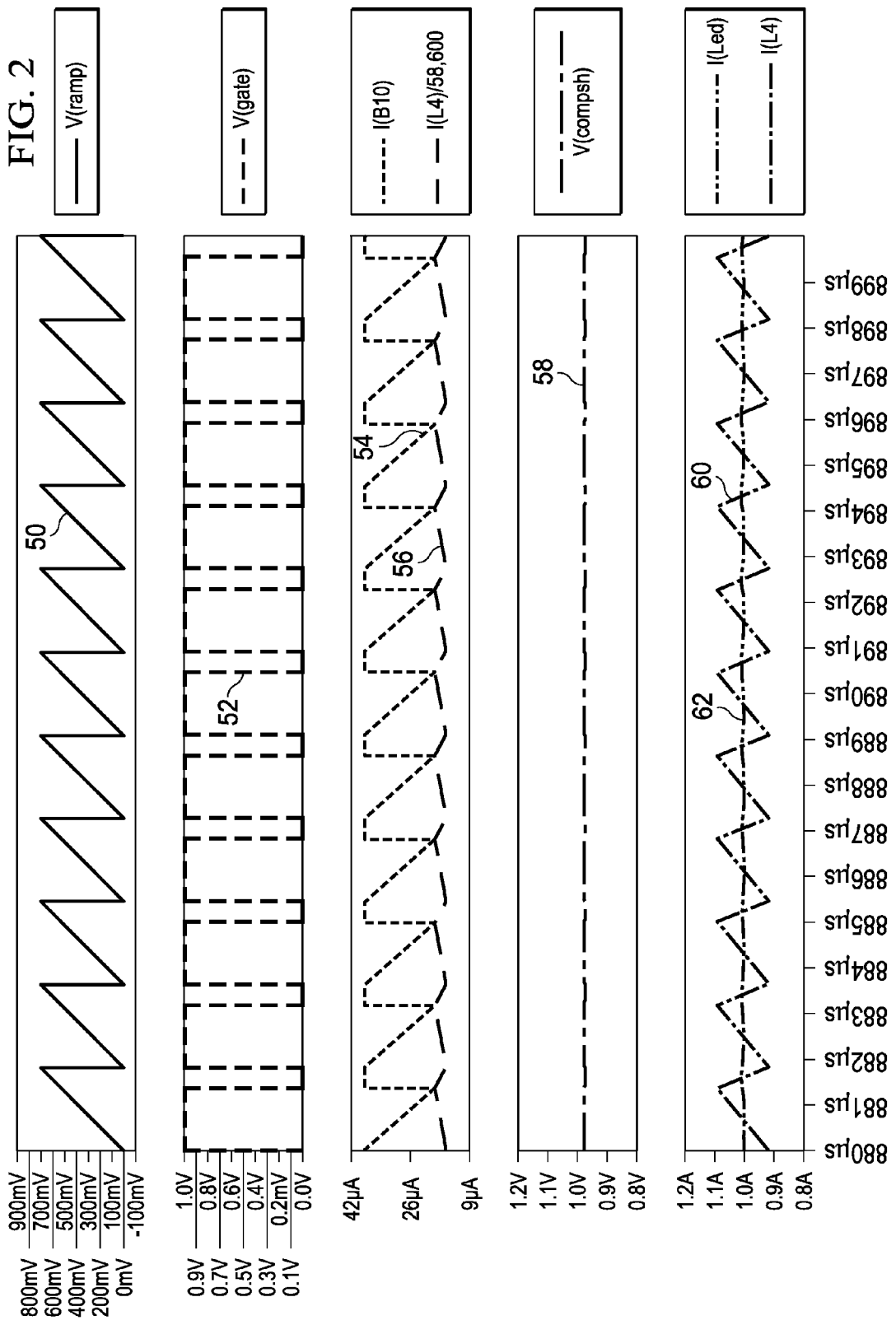
FIG. 2 illustrates various waveforms of the LED driver system of FIG. 1 during full scale brightness mode.

FIG. 2 illustrates various waveforms of the LED driver system 10 during full brightness mode. A waveform V(ramp) 50 illustrates voltage versus time of the output of the oscillator 34 with PLL that is provided to the set input of the RS flip flop 26, which results in the generation of a waveform V(gate) 52 that illustrates voltage versus time of the gate drive signal to the power transistor Q3. Each oscillator period (as indicated by the rising edge of the ramp sawtooth waveform) turns on the power transistor Q3, as indicated by the rising gate waveform. The PWM comparator 24 is used to determine when to turn off the power transistor Q3. This is done by comparing the inductor current (L4 scaled down by 58,600) illustrated in waveform I(L4)/58600 56 and the slope compensated output compensation voltage converted to current (COMP S/H), as illustrated in a waveform I(B10) 54. When the scaled inductor current exceeds the COMP S/H current, then the power transistor is turned off, as indicated by the falling gate drive waveform 52. If the output compensation voltage is held constant as illustrated in waveform V(compsh) 58, which in steady state it is, then the peak current mode control architecture regulates the "peak" inductor current. The inductor current shown in waveform "I(L4)" 60 shows the expected ripple current at the oscillator switching frequency. The LED current illustrated in waveform I(LED) 62 shows very little ripple current, due to the LED bypass capacitor.

In PWM dimming control mode, the PWM dimming control signal toggles between a high logic state (dimming-on time periods) and a low logic state (dimming-off time periods). During dimming-on time periods, current is being provided to the LED string 14 and during dimming-off time periods, current is not being provided to the LED string 14. In accordance with an aspect of the invention, a clamping circuit 16 clamps the output of error amplifier 12 to a fixed reference voltage (e.g., ground) during the low logic state (dimming-off time periods). The clamping circuit 16 can be a transistor switch NFET Q1. Alternatively, the clamping circuit 16 can include one or more transistor switches and/or one or more additional components. Additionally, the compensation sample and hold transistor Q2 opens and disconnects the output of the error amplifier 12 from the compensation output voltage node COMP, and the And gate 28 receives the low logic state disabling the full brightness control circuit 20 during dimming-off time periods. The compensation components C1 and R1 hold the output compensation voltage at a fixed level during the dimming-off time period. Upon the PWM dimming control signal returning to the logic high state (subsequent dimming-on time period), the output of the error amplifier 12 is restored to its operating state that is was during the previous dimming-on time period, which mitigates slew errors associated with the output of the error amplifier 12 saturating to one of its rails.

Figure 3:
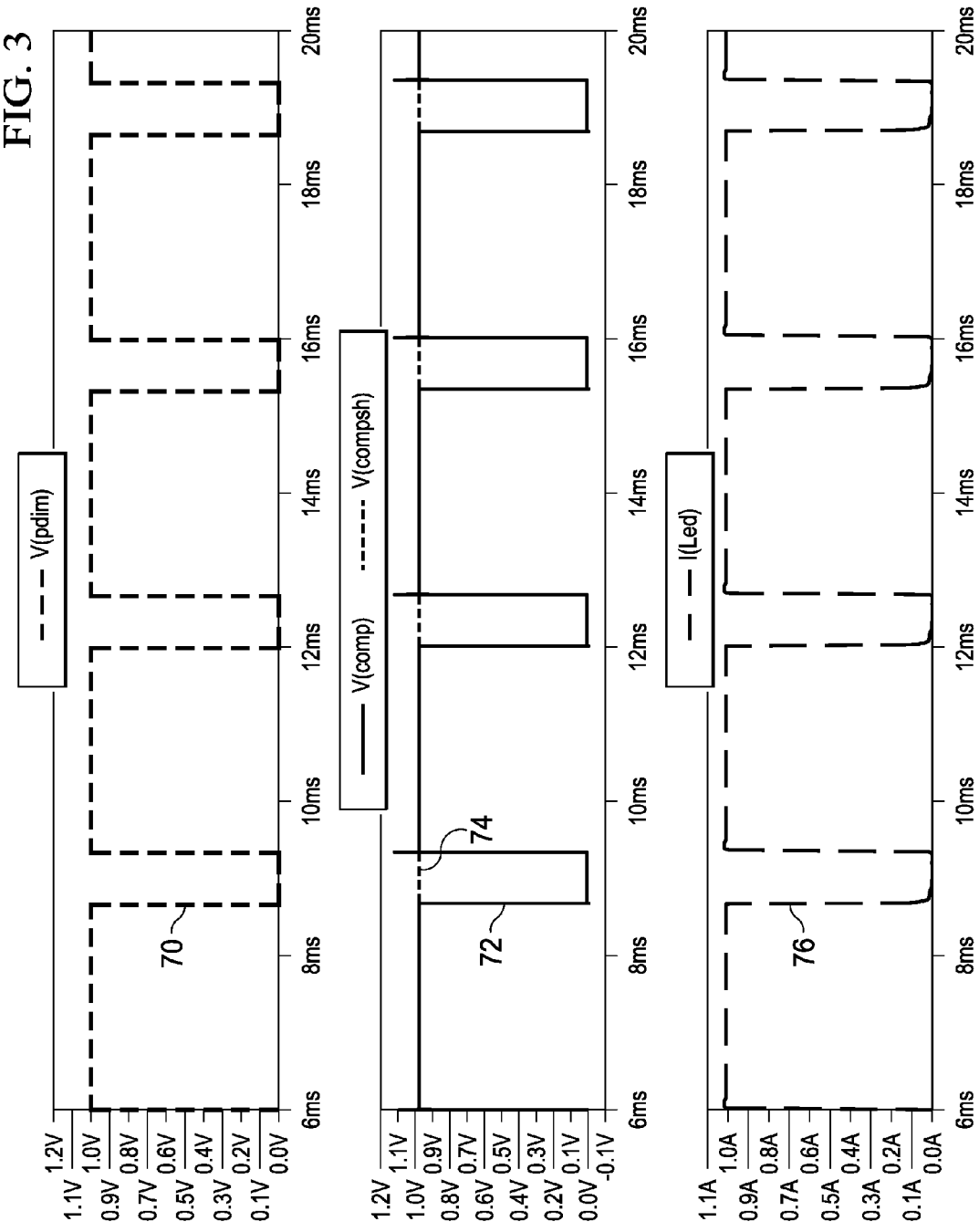
FIG. 3 illustrates various waveforms of the LED driver system of FIG. 1 during PWM dimming control mode.

FIG. 3 illustrates various waveforms of the LED driver system 10 during PWM dimming control mode. The capture below shows the system behavior during a PWM Dimming condition. A V(pdim) waveform 70 represents the PWM dimming control signal. The entire system is being pulse width modulated, for example, at a low 300 Hz rate, at 85% duty cycle. This reduces the average light output of the LED string 14. For example, 1 A*0.85=850 mA average LED current. A LED current waveform 76 approaches a pulse waveform. A V(comp) waveform 72 represents the output of the error amplifier 12, which is being pulled low during the PWM dimming off-time. This is due to the clamp. A V(compsh) signal 74 represents the compensation node. It should be noted that this voltage is held constant during the PWM dimming off-time. When the PWM dimming control signal returns high, the compensation S/H voltage restores the previous operating duty cycle, which allows the LED current to quickly return to its target regulation current. The whole cycle repeats with each PWM dimming cycle.

Figure 4:
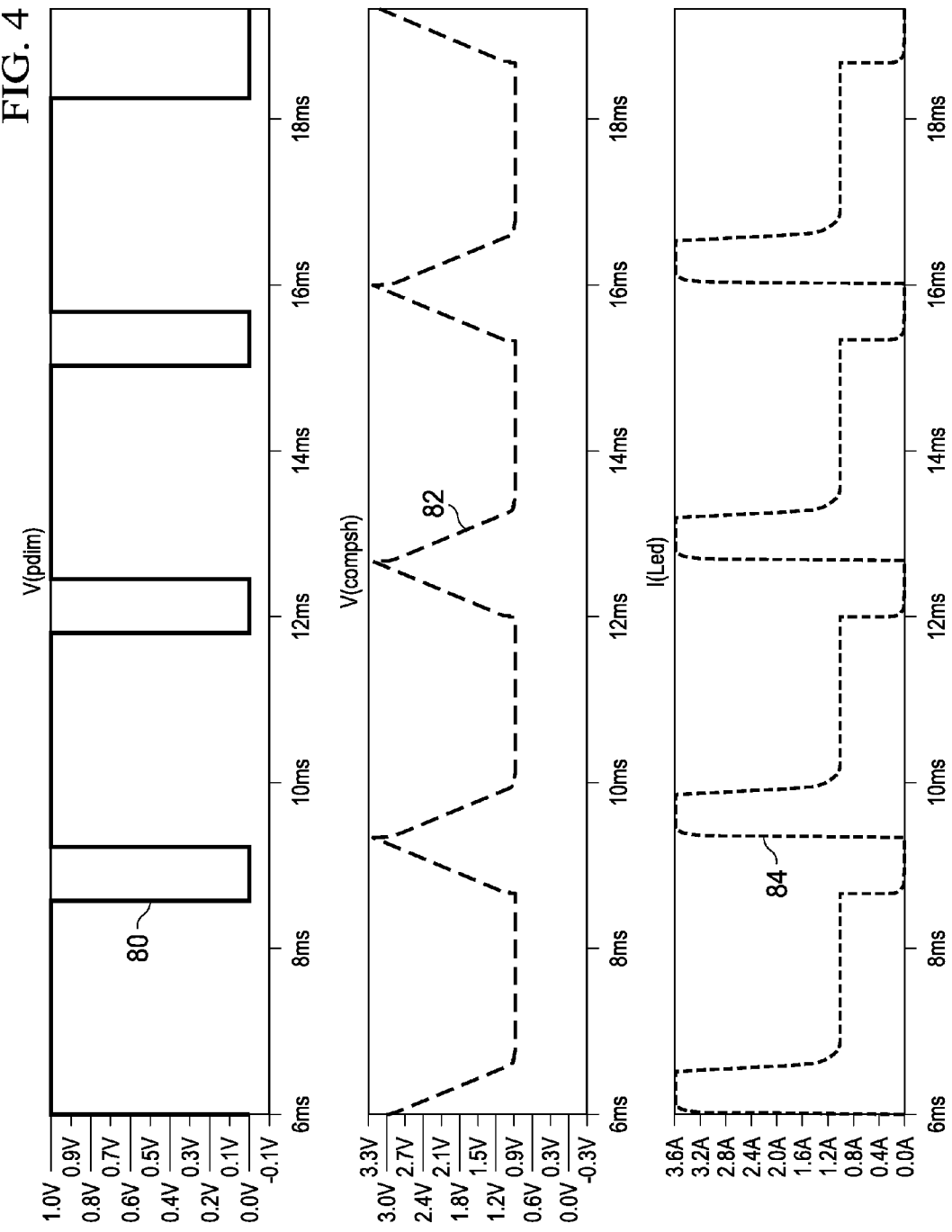
FIG. 4 illustrates various waveforms of the LED driver system of FIG. 1 during PWM dimming control mode without a clamp and a sample and hold switch in the LED driver system.

FIG. 4 illustrates various waveforms of the LED driver system during PWM dimming control mode without a clamp and a sample and hold switch in the LED driver system. When the V(pdim) waveform 80 goes low, the power transistor turns off, and the LED current 84 goes to zero. This means the VSENSE voltage is also zero volts. If the VSENSE voltage is zero, and the error amplifier 12 has, for example, 200 mV at its non-inverting input, the output of the error amplifier 12 will go high, and approach its VDD voltage rail. When the V(pdim) waveform 80 returns high, the compensation output voltage as illustrated in V(compsh) waveform 82 is way too high, and it commands a much larger duty cycle than intended. Therefore, the LED current as illustrated in I(Led) waveform 84 overshoots its regulation target of 1 A and is sitting up at 3.6 A. The error amplifier 12 has limited slew rate capability, so it takes some time for the compensation output voltage to slew back into the desired operating range and return the LED current to 1 A. This is one example of the undesirable behavior that can occur if the invention is not utilized.

Figure 5:
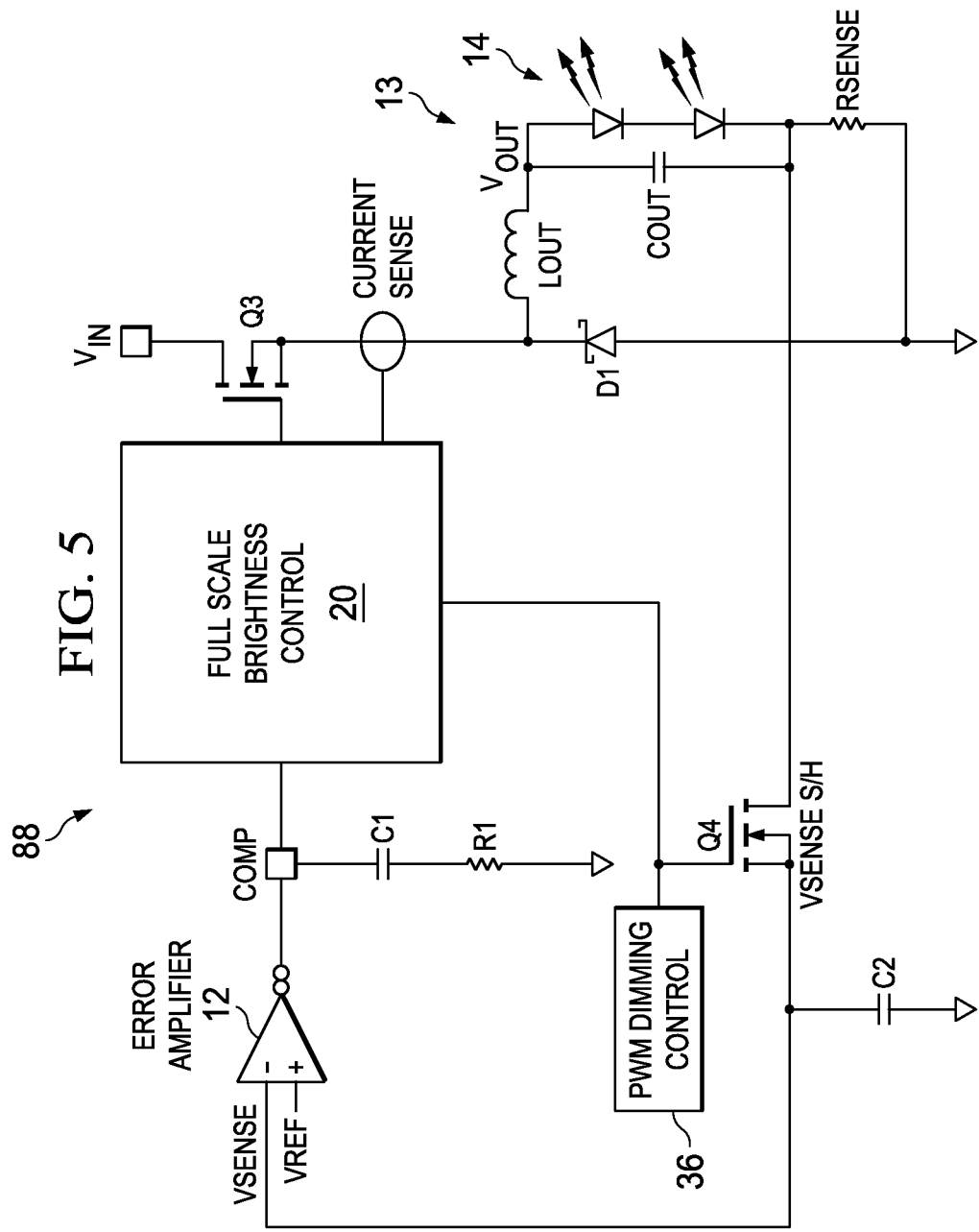
FIG. 5 illustrates an example of an LED driver system in accordance with another aspect of the invention.

FIG. 5 illustrates an example of an LED driver system 88 in accordance with another aspect of the invention. The LED power driver system 88 is essentially the same as the LED power driver system 10 of FIG. 1, except it does not include the clamp circuit 16, the inverter 18 and the sample and hold circuit Q2 located between the output of the error amplifier 12 and the compensation components C1 and R1. However, the LED driver system 88 includes a sample and hold switch Q4 disposed between the sense resistor RSENSE and the input of the sense voltage VSENSE to the error amplifier 12. The gate of the sample and hold switch Q4 is driven by the dimming control signal provided by the PWM dimming control device 36. A first end of the capacitor C2 is coupled between the sample and hold switch Q4 and the negative input terminal the error amplifier 12, and the second end of the capacitor is coupled to ground. During dimming off-times, the sample and hold switch is opened disconnecting the sense resistor RSENSE from the error amplifier 12, while the capacitor C2 holds the sense voltage VSENSE at its previous dimming-on state which holds the compensation voltage at the compensation node COMP at its previous dimming-on state. Upon reconnection of the sense resistor RSENSE to the error amplifier input during a subsequent dimming-on time period, the error amplifier 12 is restored to its previous operating state that it was at during the previous dimming-on time period.

Figure 6:
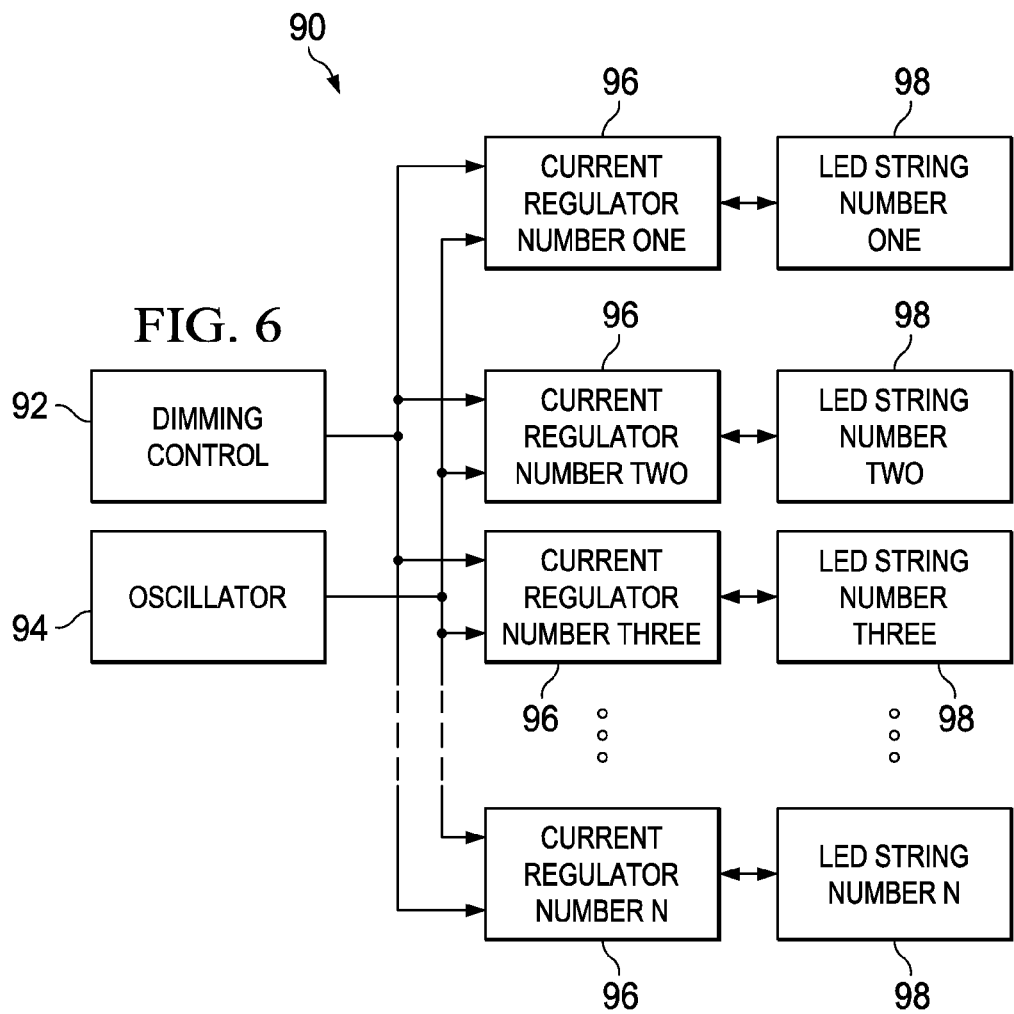
FIG. 6 illustrates a lighting system in accordance with an aspect of the present invention.

FIG. 6 illustrates a lighting system 90 in accordance with an aspect of the present invention. The lighting system 90 could be a computer display, a LCD television, a building lighting system to name a few. The lighting system 90 includes a plurality of LED strings 98, labeled LED string #1-N, where N is an integer greater than one. Each of the plurality of LED strings 98 are provided a regulated current by a respective current regulator 96 labeled current regulator #1-#N. Each current regulator 96 operates similarly or the same as regulation components of the LED driver system 10 illustrated in FIG. 1, or the LED driver system 88 of FIG. 5. Each of the current regulators 96 are synchronized by driving each of the current regulators 96 with an oscillating drive signal associated with a single oscillator 94. The oscillating drive signal can be the same oscillating drive signal for each of the current regulators 96, or be derived from the oscillating drive signal through, for example, buffers. Additionally, the dimming of each of the LED driver systems 96 is synchronized by employing a dimming control signal associated with a single dimming control circuit 92.

Figure 7:
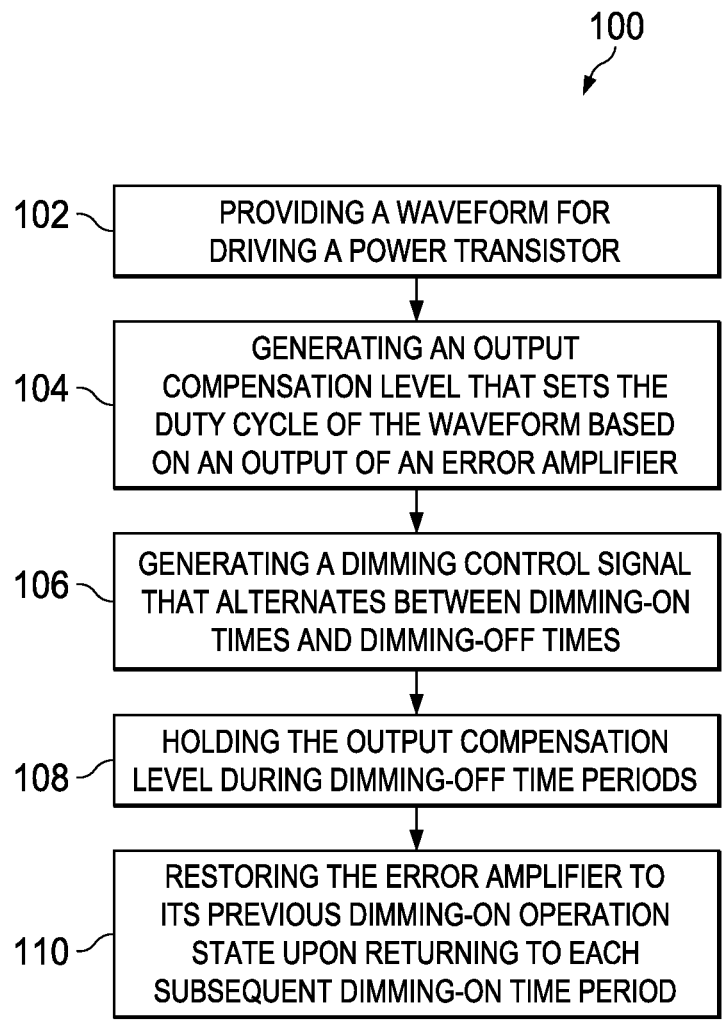
FIG. 7 illustrates an example of a method for driving LEDs in accordance with an aspect of the present invention.

In view of the foregoing structural and functional features described above, certain methods will be better appreciated with reference to FIG. 7. It is to be understood and appreciated that the illustrated actions, in other embodiments, may occur in different orders and/or concurrently with other actions. Moreover, not all illustrated features may be required to implement a method.

FIG. 7 illustrates an example of a method 100 for driving LEDs in accordance with an aspect of the present invention. The method 100 begins at 102 where a waveform is provided for driving a power transistor to generate a full scale brightness regulated current through one or more LEDs. At 104, an output compensation level (e.g., voltage or current) is generated that sets the duty cycle of the waveform based on a comparison of a desired regulated current and an actual regulated current through the one or more LEDs by an error amplifier. At 106, a dimming control signal is generated that alternates between dimming-on time periods and dimming-off time periods that cause the waveform to alternate on and off modifying the brightness of the one or more LEDs. The method then proceeds to 108. At 108, the output compensation level is held to a fixed level during each dimming-off time period. At 110, the error amplifier is restored to its previous dimming-on operating state upon returning to each subsequent dimming-on time period.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A light-emitting diode (LED) driver system comprising:
a control circuit that provides a waveform for driving a power transistor to generate a regulated current through one or more LEDs;
an error amplifier that generates an output compensation signal based on a comparison of a desired regulated current and an actual regulated current through the one or more LEDs, the output compensation signal being utilized to set an output compensation voltage that sets the duty cycle of the waveform;
a dimming control device configured during a dimming control mode to alternate between dimming-on time periods and dimming-off time periods that cause the waveform to alternate on and off modifying the brightness of the one or more LEDs; and
a sample and hold switch having a first state for holding the output compensation voltage fixed during each dimming-off time period and a second state for restoring the error amplifier to its previous dimming-on operating state upon returning to each subsequent dimming-on time period.

2. The system of claim 1, further comprising a clamping circuit configured to clamp the output of the error amplifier to a fixed voltage during each dimming-off time period.

3. The system of claim 1, further comprising one or more compensation components that set the output compensation voltage based on the output compensation signal, the output compensation voltage being utilized to provide a signal to compare to actual current through the power transistor to set the duty cycle of the waveform.

4. The system of claim 3, wherein the sample and hold switch decouples the output of the error amplifier from the one or more compensation components during dimming-off time periods and couples the output of the error amplifier to the one or more compensation components during the dimming-on time periods.

5. The system of claim 3, wherein the compensation components comprise a capacitor and resistor that are selected to compensate for a second order filter formed by output components of a LED output circuit.

6. The system of claim 1, wherein the sample and hold switch decouples a sense voltage of a sense resistor from the input of the error amplifier that provides a measurement of the actual regulated current during dimming-off time periods, and couples the sense resistor to the input of the error amplifier during the dimming-on time periods.

7. The system of claim 6, further comprising a capacitor that holds the sense voltage provided to the input of the error amplifier during the dimming-off time periods.

8. The system of claim 1, wherein the dimming control circuit disables the output of the control circuit during dimming-off time periods and enables the output of the control circuit during dimming-on time periods.

9. The system of claim 1, wherein the LED output circuit comprises an output inductor coupled between the power transistor and an output capacitor that is connected in parallel with the one or more LEDs, and a sense resistor is coupled in series with the one or more LEDs to provide a sense voltage associated with the actual regulated current, such that the error amplifier compares the sense voltage to a reference voltage to generate the output compensation signal.

10. A lighting system comprising:
   a plurality of LED systems of claim 1; and
   a single oscillator that provides a synchronized oscillating drive signal to the control circuit for each of the plurality of LED systems of claim 1.

11. A lighting system comprising:
   an oscillator that provides one or more synchronized oscillating drive signals;
   a pulse width modulated (PWM) device to provide a PWM dimming signal; and a
   plurality of current regulators, each current regulator comprising:
   a control circuit driven by the one or more synchronized oscillating driving signals to provide a waveform having a relatively high frequency for driving a power transistor to generate a regulated current through one or more LEDs;
   an error amplifier that generates an output compensation current based on a comparison of a reference voltage to a sense voltage associated with the actual regulated current through the one or more LEDs;
   one or more compensation components that set an output compensation voltage based on the output compensation current, the output compensation voltage being utilized to provide a signal to compare to actual current through the power transistor to set the duty cycle of the waveform;
   a pulse width modulated (PWM) dimming control device configured during a PWM dimming control mode to generate a dimming control signal having a relatively low frequency, compared to the frequency of the waveform, that alternates during dimming-on time periods and dimming-off time periods, which causes the waveform to alternate on and off modifying the brightness of the one or more LEDs; and
   a sample and hold switch controlled by the dimming control signal to have a first state for holding the output compensation voltage fixed during each dimming-off time period and a second state for restoring the error amplifier to its previous dimming-on operating state upon returning to each subsequent dimming-on time period.

12. The system of claim 11, wherein each of the current regulators further comprise a clamping circuit configured to clamp the output of the error amplifier to a fixed voltage during each dimming-off time period and decouple the output of the error amplifier from the fixed voltage during each dimming-on time period.

13. The system of claim 12, wherein the sample and hold switch decouples the output of the error amplifier from the one or more compensation components during dimming-off time periods and couples the output of the error amplifier to the one or more compensation components during the dimming-on time periods.

14. The system of claim 11, wherein the sample and hold switch decouples a sense voltage of a sense resistor from the input of the error amplifier that provides a measurement of the actual regulated current during dimming-off time periods, and couples the sense resistor to the input of the error amplifier during the dimming-on time periods.

15. The system of claim 14, further comprising a capacitor that holds the sense voltage fixed that is provided to the input of the error amplifier during the dimming-off time periods.

16. A method of driving light emitting diodes (LEDs), the method comprising:
   providing a waveform for driving a power transistor to generate a full brightness regulated current through one or more LEDs;
   generating an output compensation level that sets the duty cycle of the waveform based on a comparison of a desired regulated current and an actual regulated current by an error amplifier;
   generating a dimming control signal that alternates between dimming-on time periods and dimming-off time periods that cause the waveform to alternate on and off modifying the brightness of the one or more LEDs;
   holding the output compensation level to a fixed level during each dimming-off time period; and
   restoring the error amplifier to its previous dimming-on operating state upon returning to each subsequent dimming-on time period.

17. The method of claim 16, further comprising clamping the output of the error amplifier to a fixed voltage during each dimming-off time period.

18. The method of claim 17, further comprising connecting the output of the error amplifier to the compensation components during dimming-on time periods and disconnecting the output of the error amplifier from the compensation components during dimming-off time periods.

19. The method of claim 16, further comprising concurrently holding a sense voltage at a fixed level at the input of the error amplifier and decoupling a sense resistor from the input of the error amplifier that provides a measurement of the actual regulated current during dimming-off time periods, and coupling the sense resistor to the input of the error amplifier during the dimming-on time periods.

20. The method of claim 16, further comprising disconnecting the waveform from the power transistor during dimming-off time periods and connecting the waveform to the power transistor during dimming-on time periods.

* * * * *